(12) United States Patent
Strombeck (10) Patent No.: US 10,114,379 B2
(45) Date of Patent: Oct. 30, 2018

(54) POINT TO POINT MATERIAL TRANSPORT VEHICLE IMPROVEMENTS FOR GLASS SUBSTRATE

(71) Applicant: dpiX, LLC, Colorado Springs, CO (US)

(72) Inventor: John Strombeck, Colorado Springs, CO (US)

(73) Assignee: DPIX, LLC, Colorado Springs, CO (US)

( * ) Notice: Subject to any disclaimer, the term of this patent is extended or adjusted under 35 U.S.C. 154(b) by 29 days.

(21) Appl. No.: 15/165,715

(22) Filed: May 26, 2016

(65) Prior Publication Data

US 2016/0349756 A1 Dec. 1, 2016

Related U.S. Application Data

(60) Provisional application No. 62/169,401, filed on Jun. 1, 2015.

(51) Int. Cl.
*G05D 1/00* (2006.01)
*G05D 1/02* (2006.01)
*B60L 11/18* (2006.01)

(52) U.S. Cl.
CPC .......... *G05D 1/0225* (2013.01); *B60L 11/182* (2013.01); *B60L 11/187* (2013.01); *B60L 11/1829* (2013.01); *B60L 11/1861* (2013.01); *G05D 1/024* (2013.01); *G05D 1/0223* (2013.01); *G05D 2201/0216* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,698,775 A * | 10/1987 | Koch | ....................... | B25J 5/007 414/265 |
| 5,198,800 A * | 3/1993 | Tozawa | ................. | E02F 9/2033 212/276 |
| 6,477,442 B1 * | 11/2002 | Valerino, Sr. | .......... | B65G 51/34 414/730 |
| 6,764,373 B1 * | 7/2004 | Osawa | ................... | B25J 19/005 180/169 |
| 6,886,651 B1 * | 5/2005 | Slocum | ................... | B60L 13/04 104/281 |
| 7,890,235 B2 * | 2/2011 | Self | ........................ | G01S 3/143 340/539.1 |
| 8,239,084 B2 * | 8/2012 | Yamamoto | ............. | G05D 1/024 701/1 |
| 8,280,547 B2 * | 10/2012 | D'Andrea | ............... | B66F 9/063 700/214 |

(Continued)

*Primary Examiner* — Jonathan L Sample
(74) *Attorney, Agent, or Firm* — Slater Matsil, LLP (57) ABSTRACT

A method of operating a material transport vehicle ("MTV"), for transporting glass substrates used in the manufacture of image arrays in a clean room factory environment includes accepting a user input for initiating forward motion of the MTV, configuring a plurality of safety zones proximate to the MTV, detecting an intrusion into one of the plurality of safety zones, and limiting a maximum allowable forward motion of the MTV by an amount determined by the proximity of the safety zone to the MTV. The method includes further steps for additional safety, cleanliness, productivity, and maintainability improvements.

17 Claims, 12 Drawing Sheets

(56) References Cited

U.S. PATENT DOCUMENTS

| | | | | |
|---|---|---|---|---|
| 8,972,045 B1* | 3/2015 | Mountz | G06Q 10/087 | 700/213 |
| 9,043,025 B2* | 5/2015 | Brooks | B25J 9/1676 | 700/245 |
| 9,207,679 B1* | 12/2015 | Chatham | G06K 9/00798 | |
| 9,323,250 B2* | 4/2016 | Wang | G05D 1/028 | |
| 9,588,519 B2* | 3/2017 | Stubbs | G06K 7/10366 | |
| 9,637,310 B1* | 5/2017 | Zou | G05D 1/0297 | |
| 2005/0107934 A1* | 5/2005 | Gudat | G01S 5/0072 | 701/50 |
| 2006/0184275 A1* | 8/2006 | Hosokawa | B25J 9/1666 | 700/245 |
| 2008/0009967 A1* | 1/2008 | Bruemmer | G05D 1/0088 | 700/245 |
| 2009/0033269 A1* | 2/2009 | Griessnig | H04Q 9/00 | 318/563 |
| 2009/0088916 A1* | 4/2009 | Elgersma | G05D 1/101 | 701/23 |
| 2009/0271058 A1* | 10/2009 | Chilson | B60L 15/2036 | 701/23 |
| 2011/0004342 A1* | 1/2011 | Knopow | A47L 5/28 | 700/253 |
| 2011/0054689 A1* | 3/2011 | Nielsen | G05D 1/0088 | 700/258 |
| 2012/0143427 A1* | 6/2012 | Hoffman | G06Q 10/087 | 701/23 |
| 2012/0235100 A1* | 9/2012 | McCabe | B60G 17/08 | 254/2 R |
| 2012/0239259 A1* | 9/2012 | McCabe | B60G 17/016 | 701/50 |
| 2014/0135984 A1* | 5/2014 | Hirata | B25J 9/1676 | 700/255 |
| 2014/0222271 A1* | 8/2014 | Merten | H02J 7/025 | 701/22 |
| 2014/0350725 A1* | 11/2014 | LaFary | G06N 3/008 | 700/253 |
| 2015/0088310 A1* | 3/2015 | Pinter | G06Q 50/22 | 700/253 |
| 2015/0202770 A1* | 7/2015 | Patron | G05D 1/024 | 700/245 |
| 2015/0243044 A1* | 8/2015 | Luo | G06T 7/246 | 382/107 |
| 2016/0189365 A1* | 6/2016 | Lee | G06F 17/30259 | 382/103 |
| 2016/0271800 A1* | 9/2016 | Stubbs | B25J 9/1666 | |
| 2016/0274586 A1* | 9/2016 | Stubbs | G06K 7/10366 | |
| 2016/0355179 A1* | 12/2016 | Cannella | B60T 7/22 | |

\* cited by examiner

POINT TO POINT MATERIAL TRANSPORT VEHICLE IMPROVEMENTS FOR GLASS SUBSTRATE

RELATED APPLICATIONS

The present application claims the benefit of priority to U.S. Patent Application No. 62/169,401, filed Jun. 1, 2015 which is hereby incorporated by reference in its entirety for all purposes as if fully set forth herein.

BACKGROUND OF THE INVENTION

1. Field of the Invention

The present invention relates, in general, to a material transport vehicle ("MTV"), and, more particularly, to software, systems and methods for improving the safety and the clean room compatibility of the MTV.

2. Relevant Background

Material transport vehicles for transporting materials throughout a factory environment are well-known in the art. While such vehicles may be readily purchased, their suitability for transporting expensive materials in a clean room environment may be limited. For example, collisions with numerous obstacles in the factory environment may cause damage to the material payload. Further, commercially available vehicles may not possess the level of cleanliness demanded in a clean room environment due to the undesirable emission of particles. What is desired is a semi-automated MTV having further safety and cleanliness improvements, as well as other productivity and maintainability improvements, more suitable for transporting expensive materials in a clean room factory environment when compared to an existing commercially available MTV.

SUMMARY OF THE INVENTION

Briefly stated, the present invention includes improvements to a semi-automated MTV used to transport cassettes containing glass substrates in the manufacturing of large area amorphous silicon imaging arrays or flat panel displays. These improvements enhance: safety of personnel, product, and equipment; improve production line efficiencies, increase product yields, and improve equipment uptime and maintainability. The MTV according to the present invention is an improved semi-automated platform that is driven by a human operator using a hardwired joystick to transport glass substrates held within containers called cassettes to various locations on the manufacturing floor. The improved MTV of the present invention includes a number of improvements to the current MTVs for providing enhanced point to point material transport of glass substrates inside a cleanroom environment.

These improvements to the MTV are listed below in summary fashion and are further described below:

The addition of a collision avoidance system to govern the speed and motion of the MTV, given a human operator's drive command input.

The addition of a wireless material tracking system, providing identification of cassettes within the MTV and the location of the MTV while it is docked.

Lower frame enhanced vibration control of the MTV by replacing the standard casters with shock absorbing spring loaded casters.

Improved vibration control at the cassette level, by replacing the existing sorbothan pads with pneumatic spring mounts at the cassette support interface.

Replacement of the motors on the cassette transfer mechanism, simplifying power requirements and increasing cassette transfer control.

The elimination of extensive AC circuitry to power the cassette transfer motors and the removal of the complicated AC operation to DC operation switching circuitry.

The reduction of particles by replacing particle generating materials and components such as the sorbothan pads, spring mounts, brushed motors and the soft durometer caster wheels.

Increased reliability by replacing the physical matting electrical docking connections with a non-contact inductive charging system.

Increased usability by implementing an automated docking to maneuver the MTV into the material transfer point/charging docking station.

Increased safety, reliability, and maintainability by the incorporation of battery temperature, current, and voltage monitoring to prevent hazardous thermal run-a-way conditions.

DETAILED DESCRIPTION OF THE PREFERRED EMBODIMENTS

Figure 1:
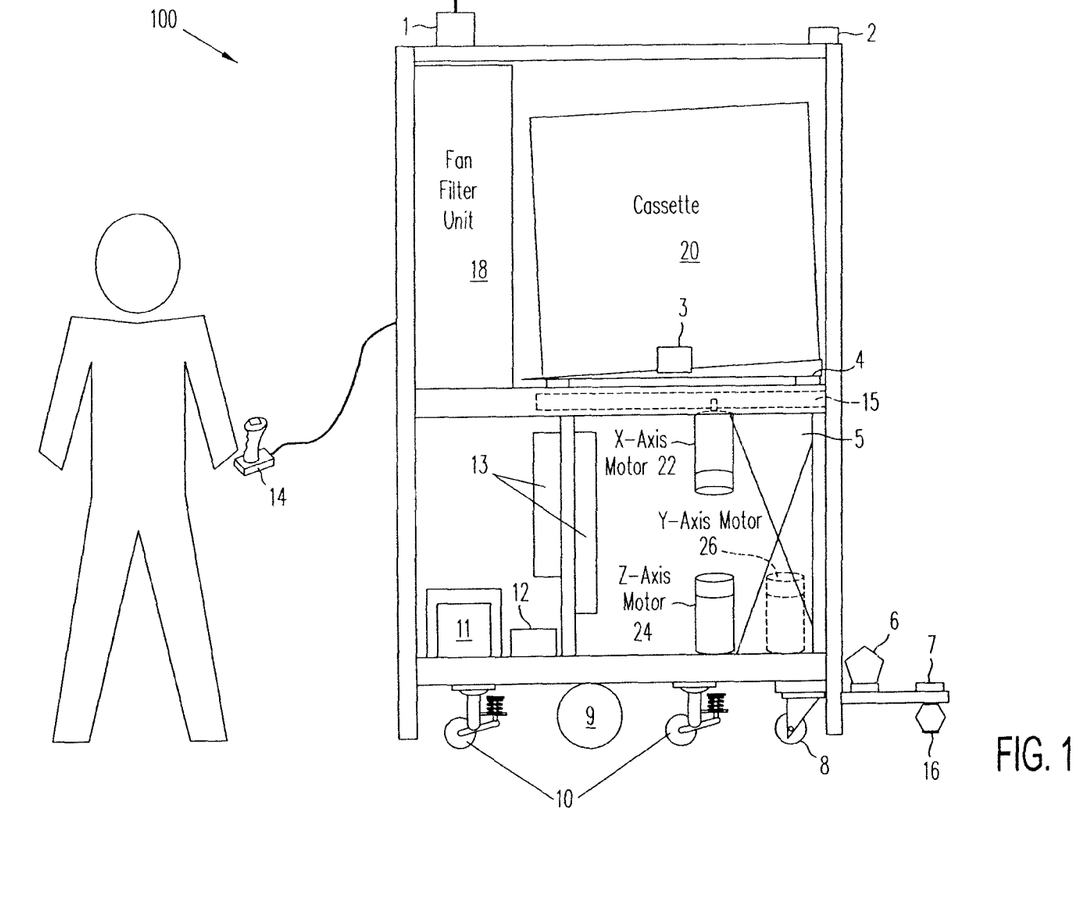
FIG. 1 shows a side view of an improved MTV according to the present invention.
Figure 2:
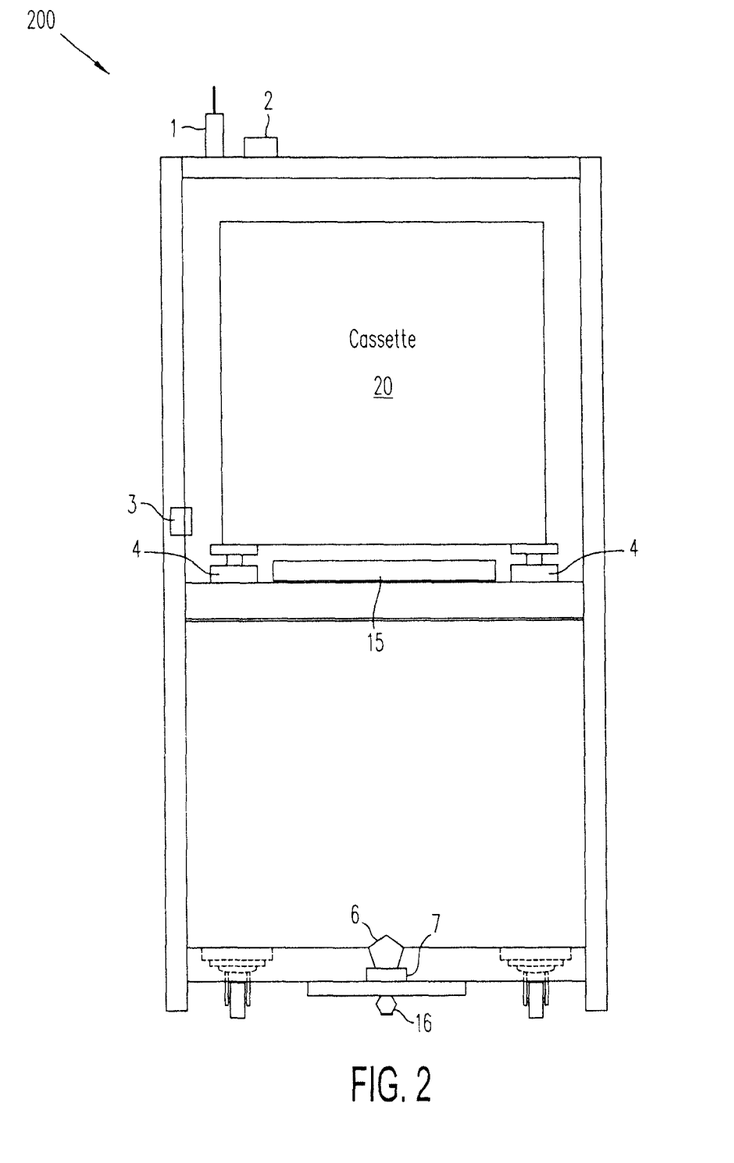
FIG. 2 shows a front view of an improved MTV according to the present invention.
Figure 3:
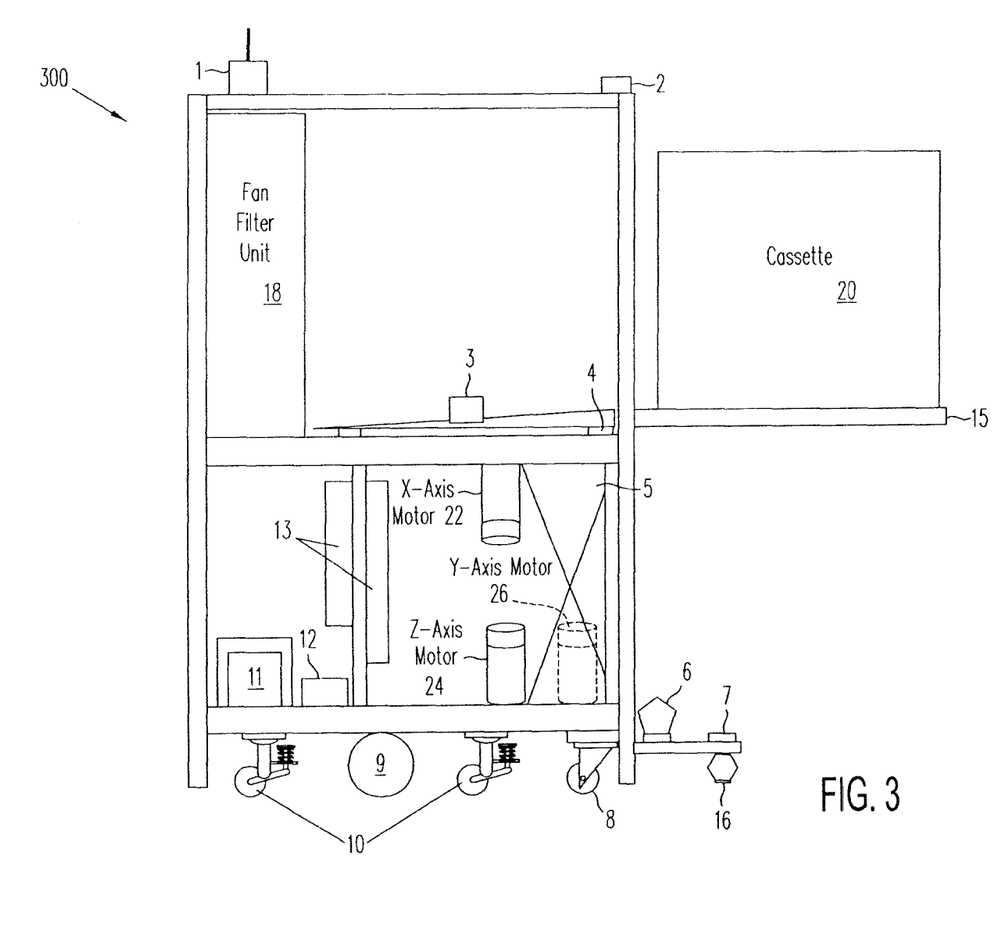
FIG. 3 shows a cassette transfer view of an improved MTV according to the present invention.

A material transport vehicle overview is now described with particular reference to drawing FIGS. 1-3. FIG. 1 shows a side view 100 of the MTV, FIG. 2 shows a front view 200 of the MTV, and FIG. 3 shows a cassette transfer side view 300 of the MTV. FIGS. 1-3 show the same MTV and thus use the same component designation numerals.

FIG. 1 depicts the side view of the Material Transport Vehicle (MTV). The MTV consists of several integrated components to provide advanced functionality as is described in further detail below.

The MTV includes the following material tracking system components:

Items in the material tracking system include: a wireless network client 1, which can include, for example, a Moxa, AirWorks AWK-1121, a networked MTV docking barcode camera 2, which can be, for example, a Keyence, SR-751, a networked cassette barcode camera 3, which can be, for example a Keyence, SR-751, along with a network switch (not explicitly shown, but housed in electronics panels 13) make up the onboard wireless material tracking system. The wireless material tracking system communicates with a factory host server via remote access points reporting the MTV docked locations and the specific cassette contained within the MTV. The wireless communication system of the MTV is described in further detail below with reference to FIG. 7.

The MTV includes the following collision avoidance system components:

Items in the collision avoidance system include: a safety laser scanner 6, which can include, for example, a Keyence, SZ04M, a drive motor controller 12, which can include, for example a RoboteQ, HBL2350, a joystick 14, which can be of conventional design, and a programmable controller (not explicitly shown, but housed in electronics panels 13), which can be, for example a Mitsubishi, Q series PLC are the primary components of the collision avoidance system. These items are closely integrated to act as a speed and motion governor, limiting the available forward and turning speed the MTV given the proximity to objects in the area of motion. Additionally, modulated audible and visual indicators inform the MTV driver and persons within the immediate area of the approaching vehicle and the approximate speed that the vehicle is traveling.

The MTV includes an automated docking system.

Items in the automated docking system include: a track sensor 16, which can be, for example a RoboteQ, MGS1600GY, the joystick 14, the drive motor controller 12, and the programmable controller allow for the automated docking function. Inputs from the track sensor and the joystick allow the MTV to self-maneuver into the docking station under the supervision of the MTV driver.

The MTV includes wheel and vibration components.

Components for the wheel and vibration components include: a standard caster 8, drive wheels 9, and spring loaded casters 10 are the wheels for the MTV. The four spring loaded casters 10, replace the standard casters at those locations to reduce vibrations at the lower back end of the MTV, especially while driving over perforated floors commonly found in cleanrooms. The drive wheels 9 remain unchanged and also contain a spring loaded component to lessen vibration. The standard casters 10 are left as standard and not spring loaded to maintain a stable docking height at the cassette transfer/charging docking stations. The wheels on all of the casters are changed to a harder durometer as the softer durometer wheels exhibited excessive wear and shed large amounts of particles in the cleanroom. Additional vibration control is installed using pneumatic mounts 4. The pneumatic mounts 4 provide good performance in damping low frequency vibrations.

The MTV includes contactless inductive charging components:

Items include: a secondary coil 7 of the inductive contact, a battery unit 11, and the battery charge comprise the onboard components of the inductive charging system. The non-contact inductive charging is accomplished when the primary and secondary inductive coils come into close proximity of each other and transfer power via an oscillating electric field. This power is feed to the battery charger converting AC voltage to DC voltage, charging the onboard batteries. The secondary inductive coupler and the battery charger are the only remaining components requiring AC voltage, greatly simplifying the present onboard electrical panels. All other onboard components are powered from the batteries.

The MTV includes a cassette transfer mechanism:

The cassette transfer mechanism comprises: a vertical lift assembly 5, a cassette transfer arm 15, and the three X, Y, and Z axis motors 22, 26, and 24. These components are used to lift and extend the cassette, delivering and retrieving the cassette to and from given process points within the cleanroom factory. The vertical lift assembly 5 has a system of linear slides, rack/pinion gears and a ball screw allowing the cassette transfer mechanism to move in the three X, Y, and Z axis coordinates. The three axis of motion allows the cassette to be properly positioned and transferred to a cassette transfer point. The Y-axis motor 26 provides side-to-side movement to properly align the cassette to the docking port by determining the Y-axis offset from the magnetic tape sensor used in the automated docking system. The Z-axis motor 24 drives the cassette arm 15 up and down to lift the cassette to the correct transfer pass height. The X-axis motor 22 drives the cassette arm 15 to extend or retract a cassette to or from the cassette docking port. A typical transfer sequence includes: 1) drive Z-axis up to lift the cassette, clearing the cassette retaining bocks in the MTV and the clamping blocks on the cassette port. 2) Drive the Y-axis to center the cassette to the cassette port. 3) Drive the X-axis extending the cassette over the cassette port clearing the clamping block on the port. 4) Drive the Z-axis down placing the cassette onto the cassette port and lowering the cassette arm enough to clear the cassette. 5) Drive the X-axis retracting the cassette arm back into the MTV. FIG. 3 shows cassette 20 in the extended position as it places a cassette 20 on a transfer/charging station located at the different processing points. The three X, Y, and Z axis motors 22, 26, and 24 are replaced with DC motors and have built-in controllers, encoders and brakes for easier system implantation and improved cassette transfer control.

The MTV according to the present invention includes electronics panel 13.

DC power distribution and the programmable controller system are located within the electronic panels 13. These panels contain the necessary DC power/voltage converters and wiring distribution to the individual components.

The collision avoidance system is described in further detail below.

Figure 4:
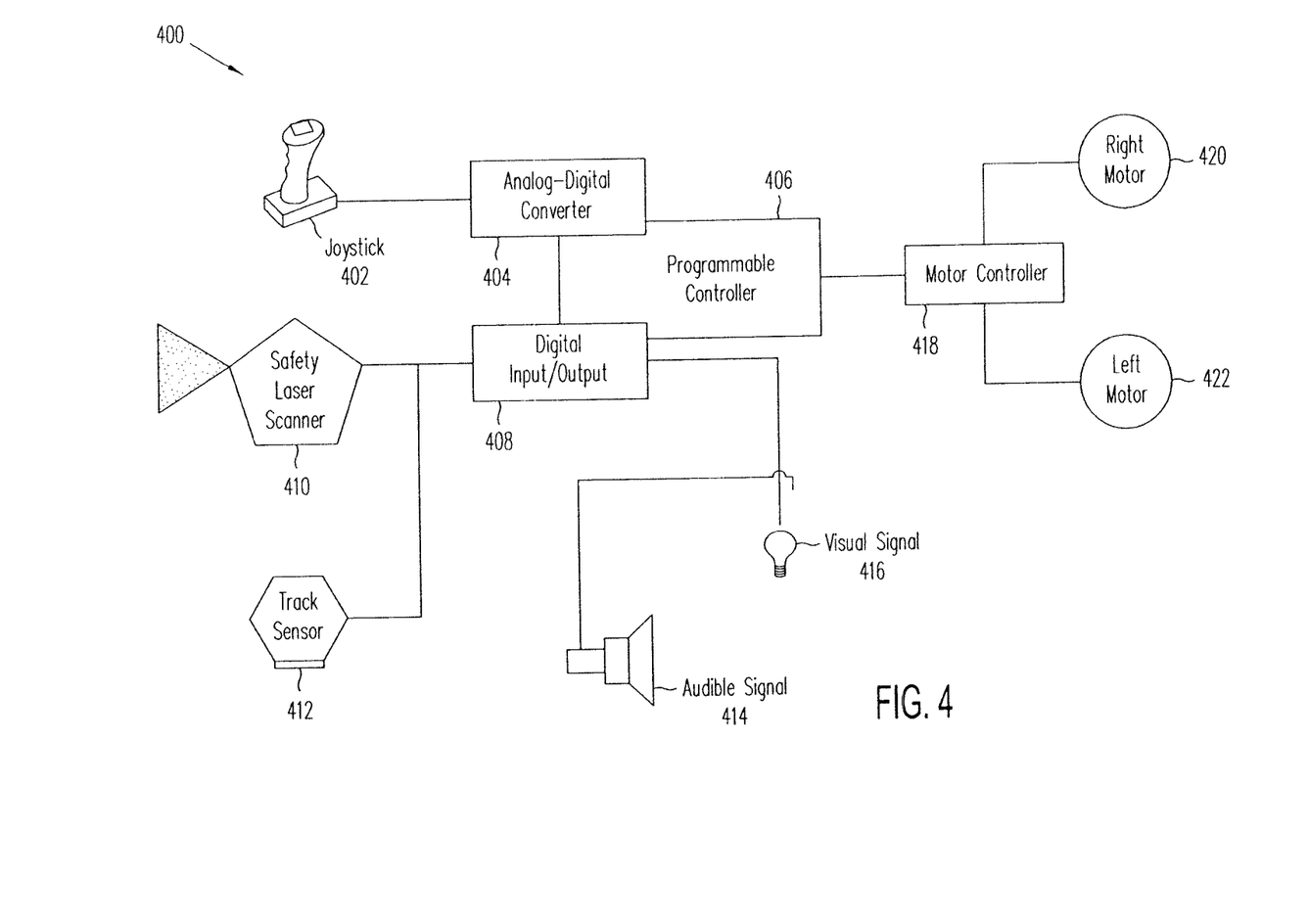
FIG. 4 shows a collision avoidance block diagram for the MTV according to the present invention.

FIG. 4 shows the collision avoidance block diagram 400. The collision avoidance system comprises three primary sections: input, control, and output. The individual components within these three sections are tightly integrated and designed to be a collaborative robotic system, providing an adaptive and cohesive human-machine interface.

Figure 5:
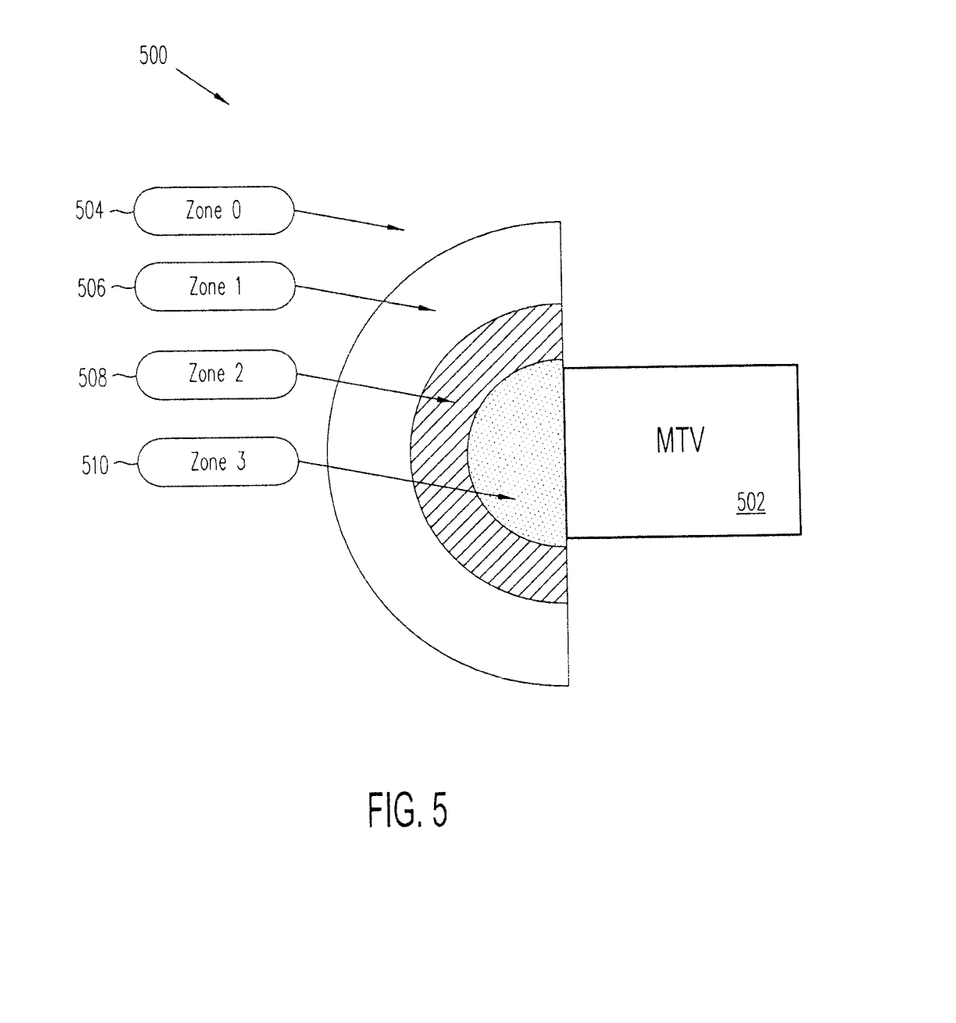
FIG. 5 shows a plurality of safety zones associated with the operation of the MTV according to the present invention.
Figure 6A:
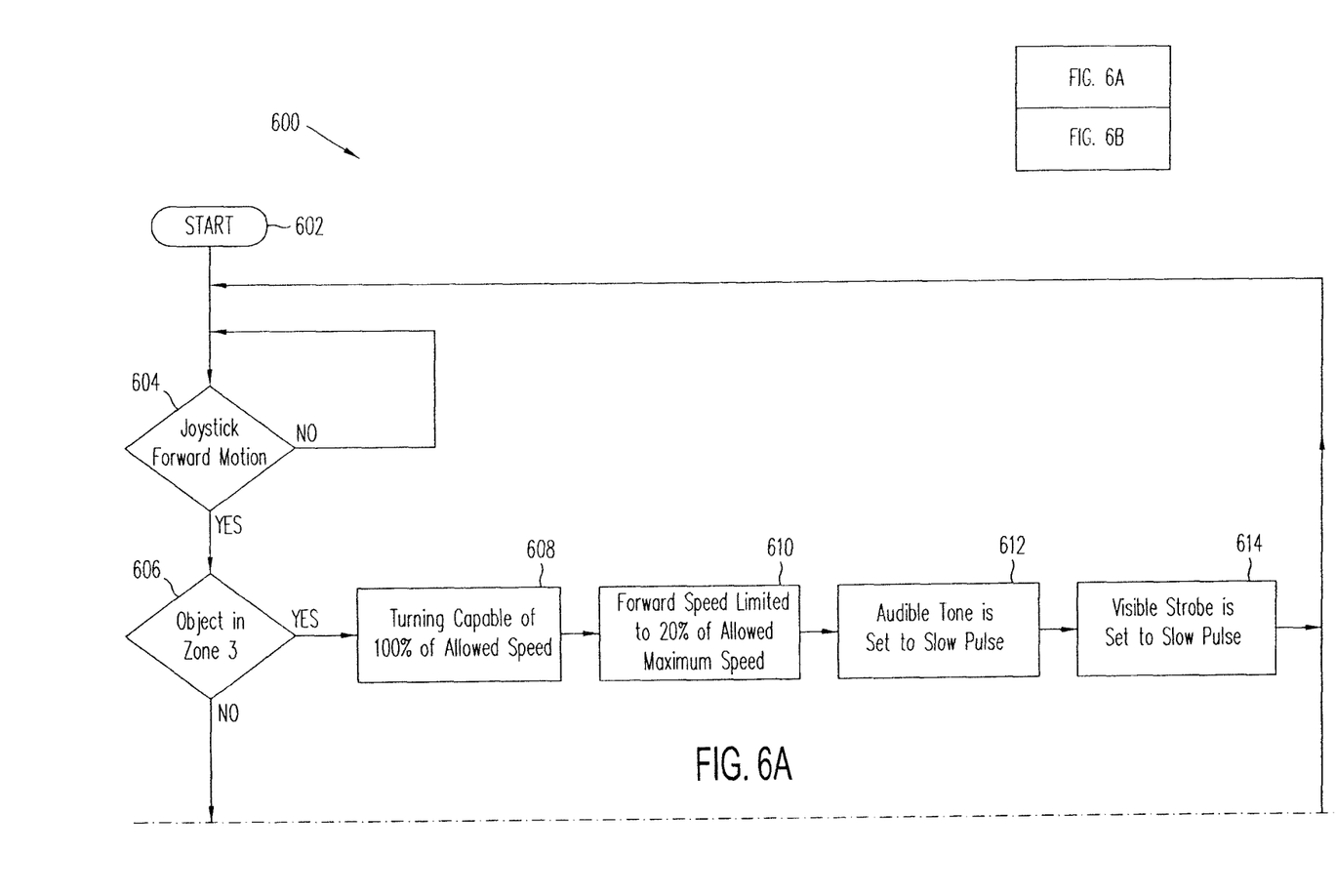
FIGS. 6A and 6B show a safety zone flow chart associated with the operation of the MTV according to the present invention.
Figure 6B:
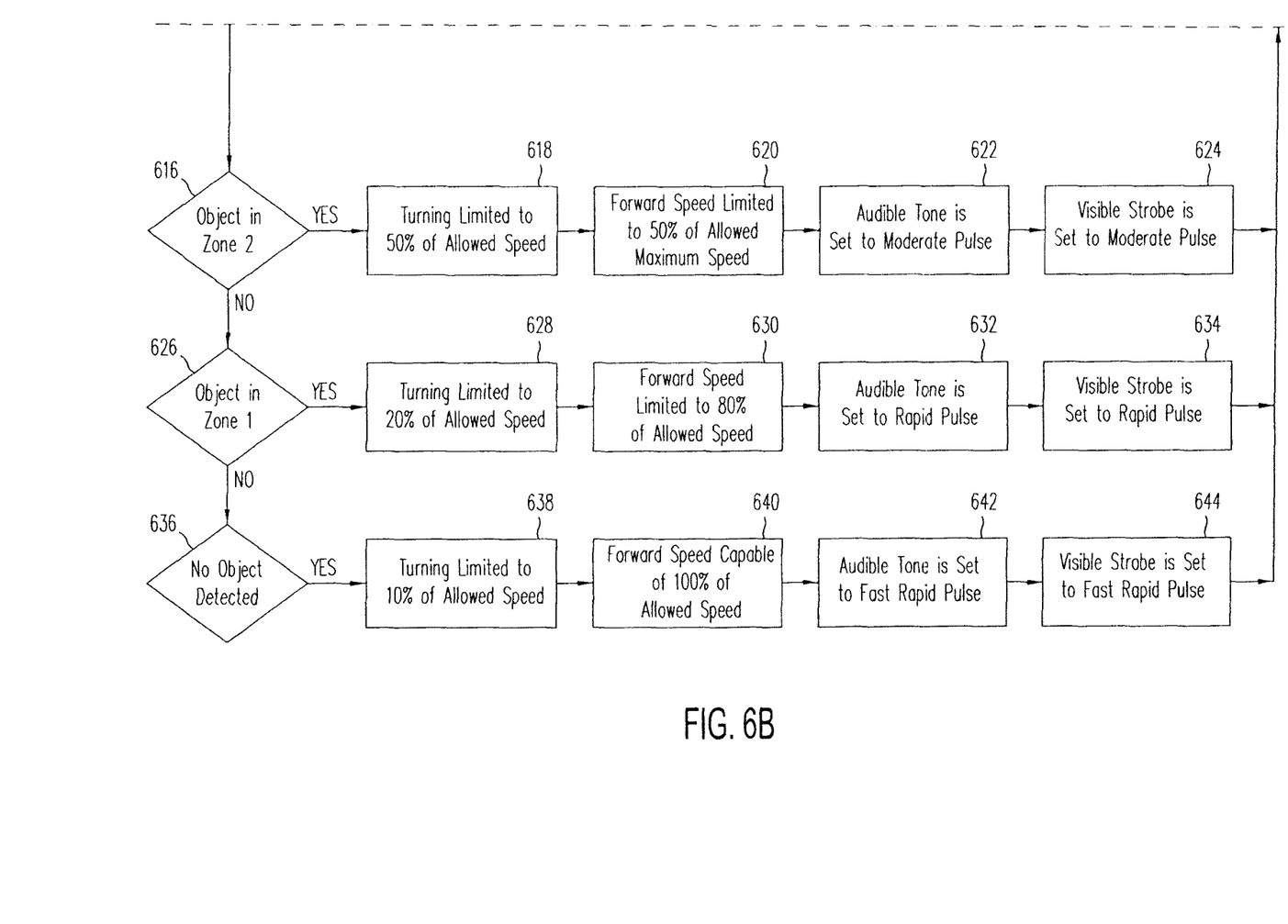

The input section includes the joystick 402 and safety laser scanner 410, where the joystick 402 accepts the user's input to drive the MTV, while the driver walks just behind and to the left of the MTV. The joystick's analog signal passes through an analog to digital converter 404, where the digital signal is then processed and evaluated by the programmable controller 406 given the environmental conditions detected by the safety laser scanner 410. The safety laser scanner 410 itself is an intelligent programmable device, allowing it to be programmed and configured to meet a large variety of applications. Within the safety laser scanner's program, different zones can be uniquely configured: FIG. 5 shows an example of the different configured safety zones, and is described in further detail below. Intrusion or lack thereof, within the different safety zones produce digital signals processed by the programmable controller 406. The programmable controller processes these inputs using software algorithms to produce semi-automated outputs to the motor controller 418 drive motors 420 and 422 are used to produce the desired and collaborative drive motion of the MTV. Additionally, the programmable controller 406 varies the audible/visual indicators shown in Table 1 to produce informative audible signal 414 and visual indicators 416. These audible and visual signals are intended to make the MTV's driver and personnel in the vicinity aware of the MTV's speed. Digital I/O electronics couple the programmable controller 406 to the safety laser scanner 410, the track sensor 412, the audible signal generator 414 such as a speaker, and the visual signal generator 416 such as a strobe light. FIGS. 6A and 6B contain a flow chart of how the programmable controller software performs this control and is explained in further detail below.

FIG. 5 shows a diagram of the safety zones 500 provided by the laser scanner in the MTV 502. A safety zone 510 designated "Zone 3" is a semi-circle with a radius of about, for example, two feet. A safety zone 508 designated "Zone 2" is contiguous with safety zone 510 and has an outer radius of about, for example, four feet. A safety zone 506 designated "Zone 1" is contiguous with safety zone 508 and has an outer radius of about, for example, six feet. A safety zone 504 designated "Zone 0" lies beyond the outer radius of safety zone 506. It will be apparent to those skilled in the art that other shapes or radii can be used for the safety zones according to the type of laser scanner selected and the specific type of programming used.

The forward and turning motion of the MTV is accomplished by varying the speed to the two drive motors which are configured as a dual drive system providing a differential drive control. This differential drive control gives the MTV a "Tank-Like" drive and steering functionality. There are two drive signals used to control the MTV drive motion the $1^{st}$ is to control the forward and reverse motion which drives the two drive wheels at the same speed and direction to accomplish linear motion. The $2^{nd}$ drive signal varies the speed and direction of the two drive wheels allowing the MTV to turn or pivot about the MTV center. FIGS. 6A and 6B show an example of a safety zone flow chart 600 used with the MTV of the present invention. The flow chart represents the method of operation for the collision avoidance system of the MTV according to the present invention. The method starts at step 602. At step 604, the joystick signal for initiating forward motion is detected. If at step 606 an object is detected in Zone 3 maximum turning is limited to 100% of allowed speed at step 608. Forward speed is limited to 20% of allowed maximum speed at step 610. An audible tone is set to a slow pulse at step 612. A visible strobe is set to a slow pulse at step 614. The method is then returned to step 604. If at step 616 an object is detected in Zone 2, maximum turning is limited to 50% of allowed speed at step 618. Forward speed is limited to 50% of allowed maximum speed at step 620. An audible tone is set to a moderate pulse at step 622. A visible strobe is set to a moderate pulse at step 624. The method is then returned to step 604. If at step 626 an object is detected in Zone 1, maximum turning is limited to 20% of allowed speed at step 628. Forward speed is limited to 80% of allowed maximum speed at step 630. An audible tone is set to a rapid pulse at step 632. A visible strobe is set to a rapid pulse at step 634. The method is then returned to step 604. If at step 636 no object is detected, maximum turning is limited to 10% of allowed speed at step 638. Forward speed is allowed to assume 100% of allowed maximum speed at step 640. An audible tone is set to a fast rapid pulse at step 642. A visible strobe is set to a fast rapid pulse at step 644. The method is then returned to step 604.

Furthermore, the inputs sensors for determining the surrounding environment are not limited to simple laser scanners. This system and method of the present invention could easily accommodate more advanced visions systems such as 3D time-of-flight cameras allowing for a more sophisticated control system.

The theory of operation for the collision avoidance system according to the present invention in conjunction with the safety zones is shown in table form below with respect to Table 1:

TABLE 1

Safety Zones
Theory of Operation Table

| Safety Zone | Allowable Forward Motion | Allowable Turning Motion | Audible Output | Visual Output |
| --- | --- | --- | --- | --- |
| Zone 0 | Maximum Vehicle Speed | Very Regulated | Fast Rapid Pulsed Tone | Fast Rapid Strobe |
| Zone 1 | Limited Max Vehicle Speed | Highly Regulated | Rapid Pulsed Tone | Rapid Strobe |
| Zone 2 | Moderate Vehicle Speed | Moderately Regulated | Moderate Pulsed Tone | Moderate Strobe |
| Zone 3 | Slow Vehicle Speed | Slightly Regulated | Slow Pulsed Tone | Slow Strobe |

The MTV of the present invention includes an automated docking function, which is described in further detail below.

The automated docking function is intended to allow the MTV driver to position the MTV near a docking station and then command the MTV to automatically drive the remaining distance into the docking station. The track sensor 412 shown in FIG. 4 is used to detect a magnetic or optical strip on the floor leading toward the docking station. Once the magnetic strip on the floor is detected an indicator lights up informing the MTV driver that it is in a position to be docked. The MTV driver presses a button on the joystick to disable the collision avoidance and commanding the MTV to drive into the docking station. The programmable controller uses the signals from the track sensor 412 to control the motors following the strip on the floor guiding the MTV into the docking station.

The MTV of the present invention includes a wireless material tracking system, which is described in further detail below.

Figure 7:
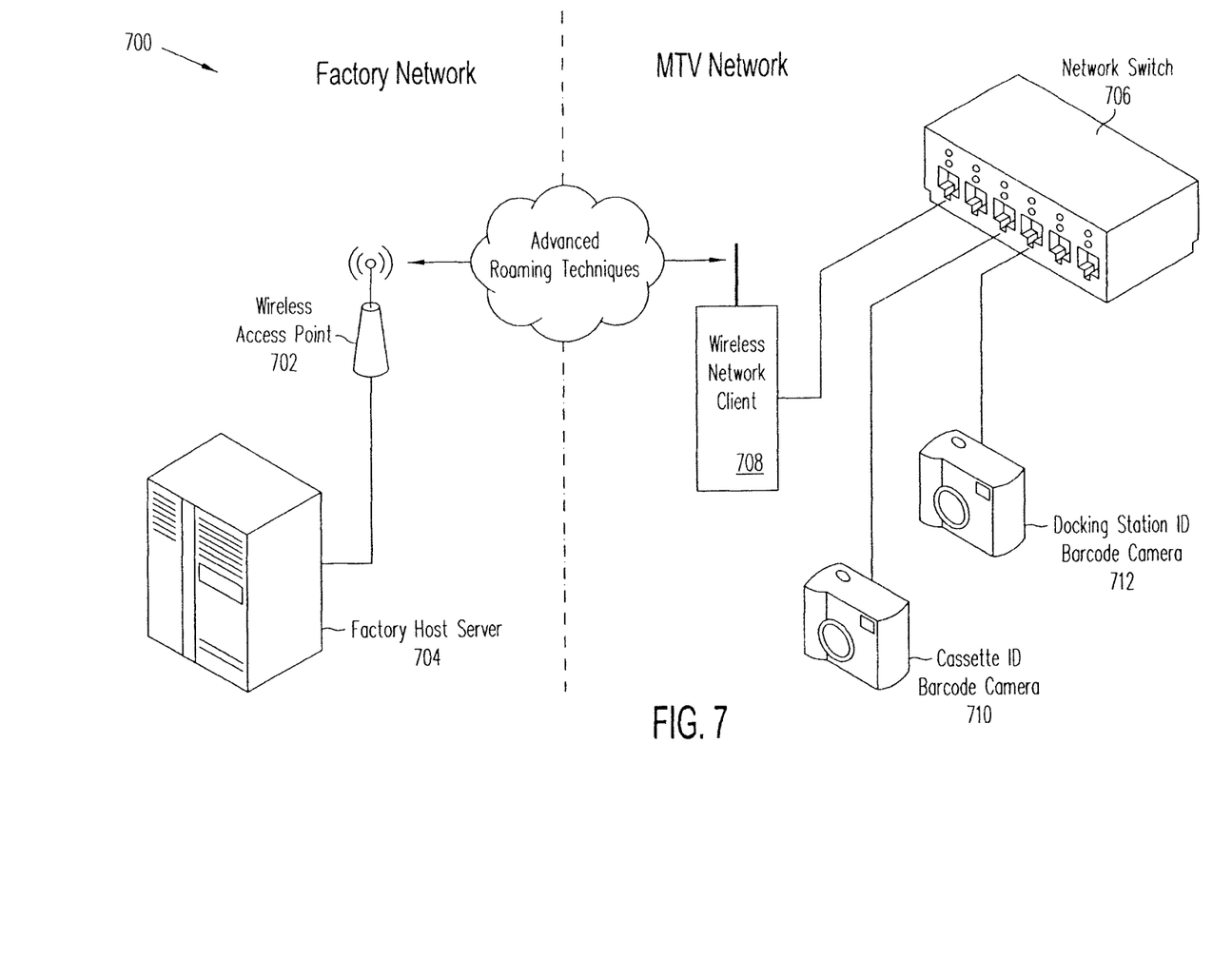
FIG. 7 is a diagram of a wireless communication network associated with the operation of the MTV according to the present invention.

The wireless material tracking system 700 is detailed in FIG. 7. FIG. 7 shows the connectivity between the factory host network and the MTV's onboard network. The wireless client 708 on the MTV has consistent connectivity and communications with the factory host using advanced roaming techniques, switching between different wireless access points 702 while the MTV moves throughout the factory. The wireless client connects to a switch 706 and using standard internet protocols, enabling the MTV to communicate with multitude of internet devices. Given the emerging technology "Internet of Things" this configuration allows for many possible configurations and uses. In this example there are two internet barcode reading cameras 710, 712 with internal decoding, supporting a wide verity of barcode standards. One of the cameras 710 is positioned to read the barcode on the cassette containing the glass substrates and the other camera 712 is positioned to read the barcode located on the docking stations. Using a polling method, the cameras are triggered remotely by software services running on the factory host server 704 to read which cassette if any resides inside the MTV. The same polling method is used to read the barcode while the MTV is docked at a cassette transfer point, identifying where it is docked. Alternatively, cameras 710, 712 could be triggered by the onboard controller to make for a more effective solution. In this example, the MTV's onboard controller would initiate triggering the barcode reads given the detection of a cassette present or after the MTV detects that it is at docked at a cassette transfer point docking station.

The MTV of the present invention uses a vibration control system, which is described in further detail below.

Figure 8:
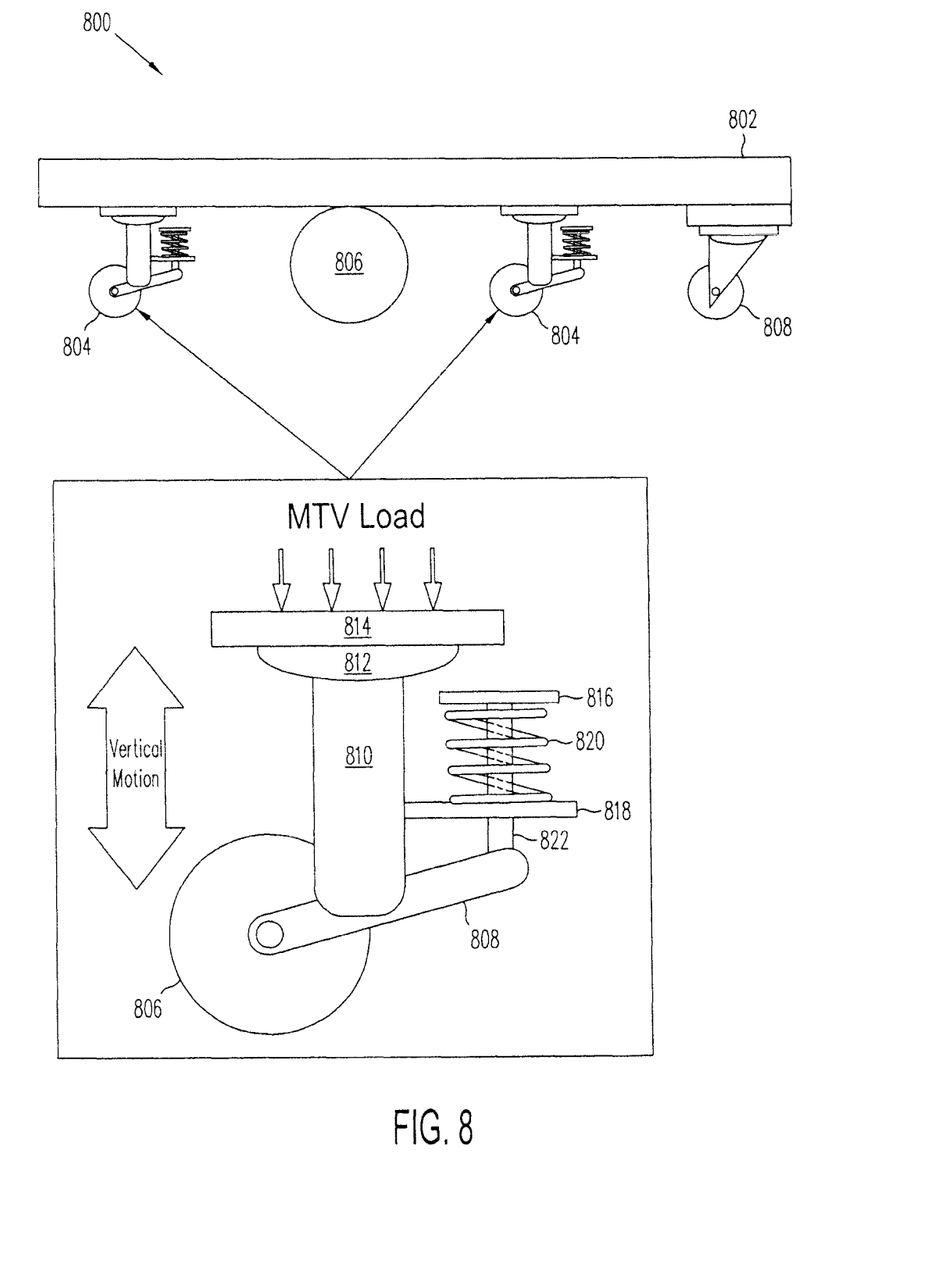
FIG. 8 is a diagram of spring loaded casters used by the MTV according to the present invention.

FIG. 8 details the spring loaded casters in diagram 800. The spring loaded casters 804 have cantilevered wheels with a spring on the opposite side of the pivot point allowing the wheel to have a vertical motion while supporting the load of the MTV. The cantilever arms 808 are pinned at the caster leg 810 providing a vertical motion on the wheel 806. This vertical motion is controlled by the spring tension exerted by spring 820. The spring 820 is held in place by the spring holder 818 which is secured to the caster leg 810. The spring force is transferred to the cantilever arms 808 by the spring pin 822 and the spring retainer 816. The spring loaded casters are swivel casters containing bearing within the horn base 812 allowing it to swivel about the mounting base 814. Previous caster configurations utilized very low 65 durometer polyurethane wheels which did not effectively control vibrations and exhibited extensive wearing, causing particles within the cleanroom. The spring loaded casters, along with the harder 95 durometer wheels, provide the required vibration control while eliminating the particle generation. Different spring tensions could be used to allow for a variety of MTV's having different loads and payload requirements.

Figure 9:
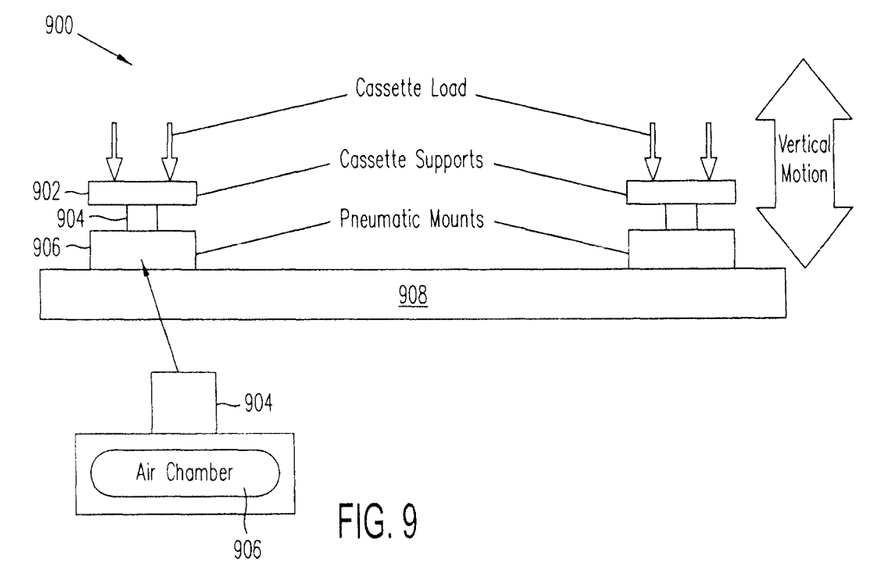
FIG. 9 shows a front view diagram of pneumatic vibration control mounts used by the MTV according to an embodiment of the present invention.

FIG. 9 is a diagram 900 that shows the vibration control pneumatic mounts 906. The pneumatic mounts are rubber supports with an internal air chamber which are molded to a metal base for mounting. A threaded fastener hole is molded into the top mount 904 of the unit to secure the load supports 902. The pneumatic mounts provide very good vibration control especially at the lower frequency ranges. The internal air chamber can be pressurized to a range of air pressure, allowing a wide range of vibration control and loads. Low forcing frequencies are exhibited on the MTV while driving the MTV at normal walking speeds and even lower forcing frequencies are measured while maneuvering at slower speeds. The pneumatic vibration mounts react well to these low forcing frequencies and effectively dampen the vibrations without exuding uncontrolled oscillations (Bobble Head Effect). The pneumatic mounts are compatible with the cleanroom environment and replace both softer rubber and spring mounts which shed particles.

Figure 10:
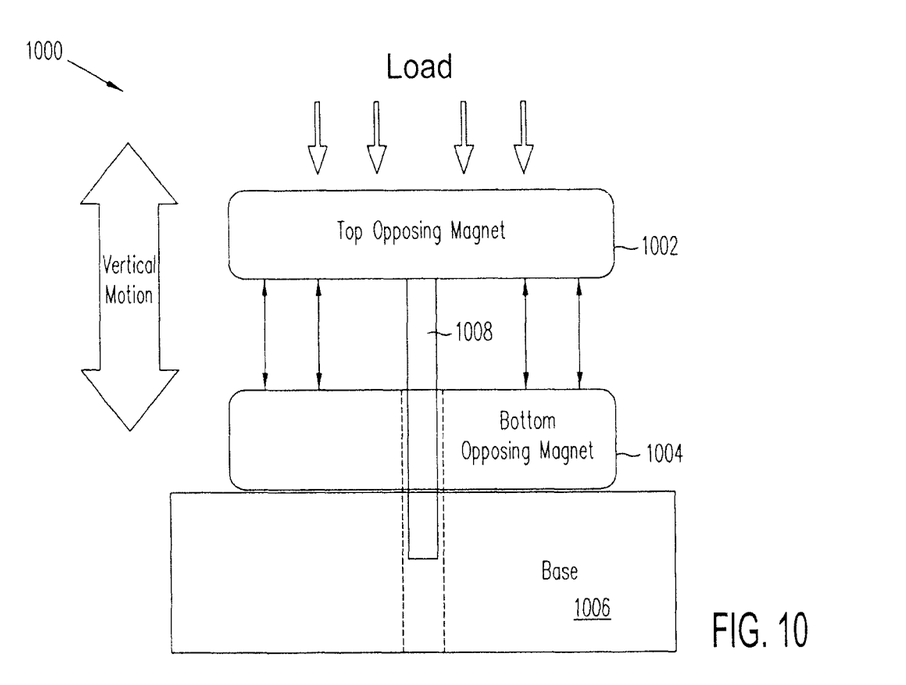
FIG. 10 is a diagram of magnetic vibration control mounts used by the MTV according to an embodiment of the present invention.

Alternatively, in lieu of the pneumatic spring mounts, a magnetic spring could provide effective vibration control. Given the recent awareness of commercially available and inexpensive printed magnets, a custom engineered magnetic spring is a viable solution. Printable magnets are capable of having both N and S fields together enabling them to attract at a distance but repel when close, providing a levitated, in position force. Additionally, these magnets have a staying force keeping them aligned. FIG. 10 is a diagram 1000 of an example of the magnetic spring mount vibration control. Using two opposing magnets, the magnetic Yield creates an air gap allowing vertical movement and damping vibration forcing frequencies. FIG. 10 thus shows a top opposing magnet 1002, a bottom opposing magnet 1004, a base 1006, and alignment shaft 1008.

The electronics for the MTV is described in further detail below.

Figure 11:
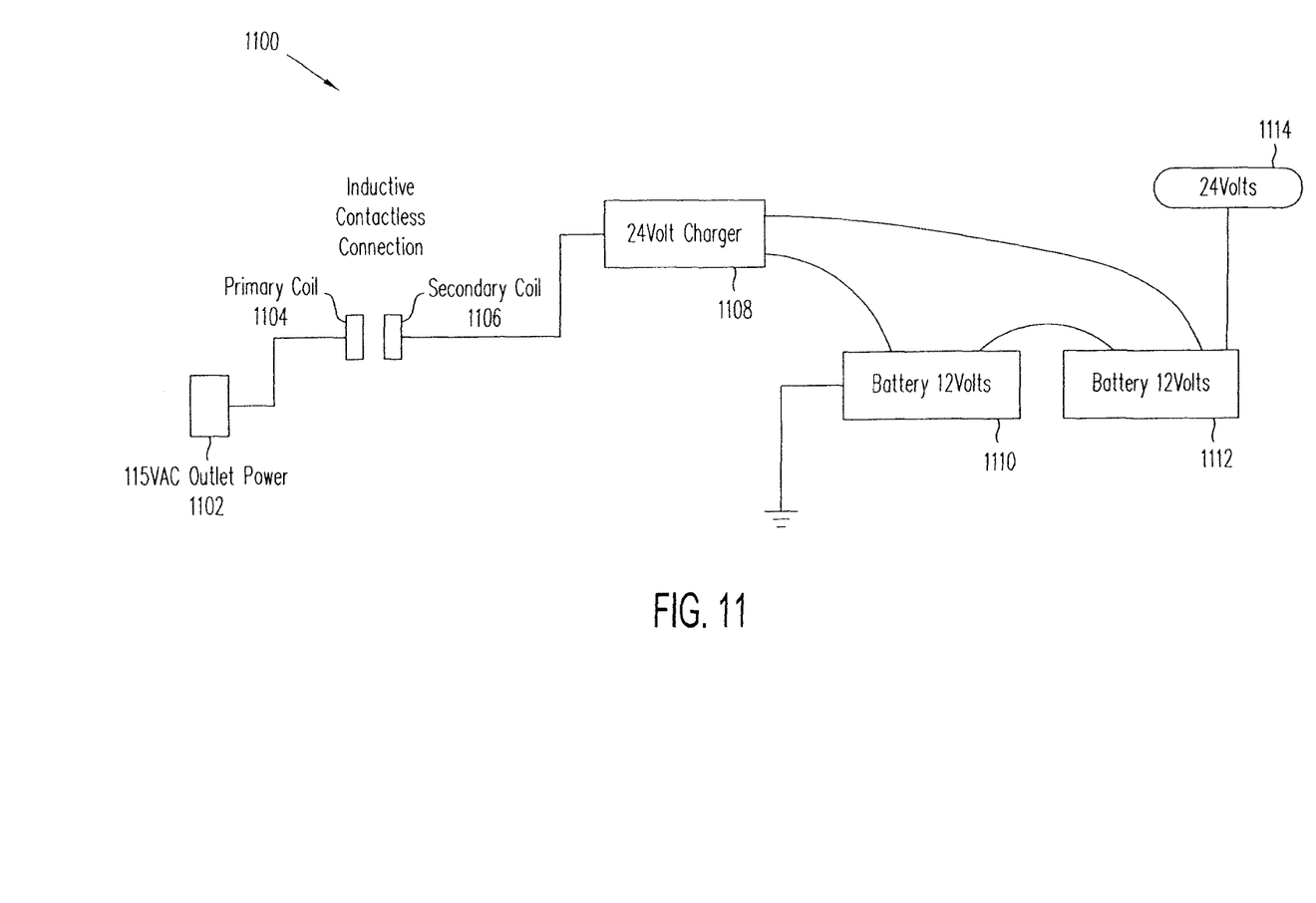
FIG. 11 is a diagram of the power source used by the MTV according to the present invention.

The power source 1100 is shown in FIG. 11. FIG. 11 shows the recharging circuit for the two onboard sealed lead-acid batteries 1110 and 1112. The 24V battery power 1114 is routed to all the onboard electronics and has the usual circuit isolation and protections using rated circuit breakers and fuses. DC to DC power converters are used as needed for devices that require different DC voltages. The only onboard AC is used to power the battery charger coming from the contactless inductive coupling. The primary side of the inductive coupling is part of a fixed docking station and facilitated with standard 115 VAC outlet power. These docking stations are located the various cassette transfer points throughout the factory. FIG. 11 thus shows an AC power outlet 1102 coupled to a primary coil 1104. These two components are stationary and do not form part of the mobile MTV. A secondary coil 1106 is coupled to a 24V charger 1108, which is in turn coupled to the two batteries 1110 and 1112, which generate the 24V power 1114 for the MTV.

Figure 12:
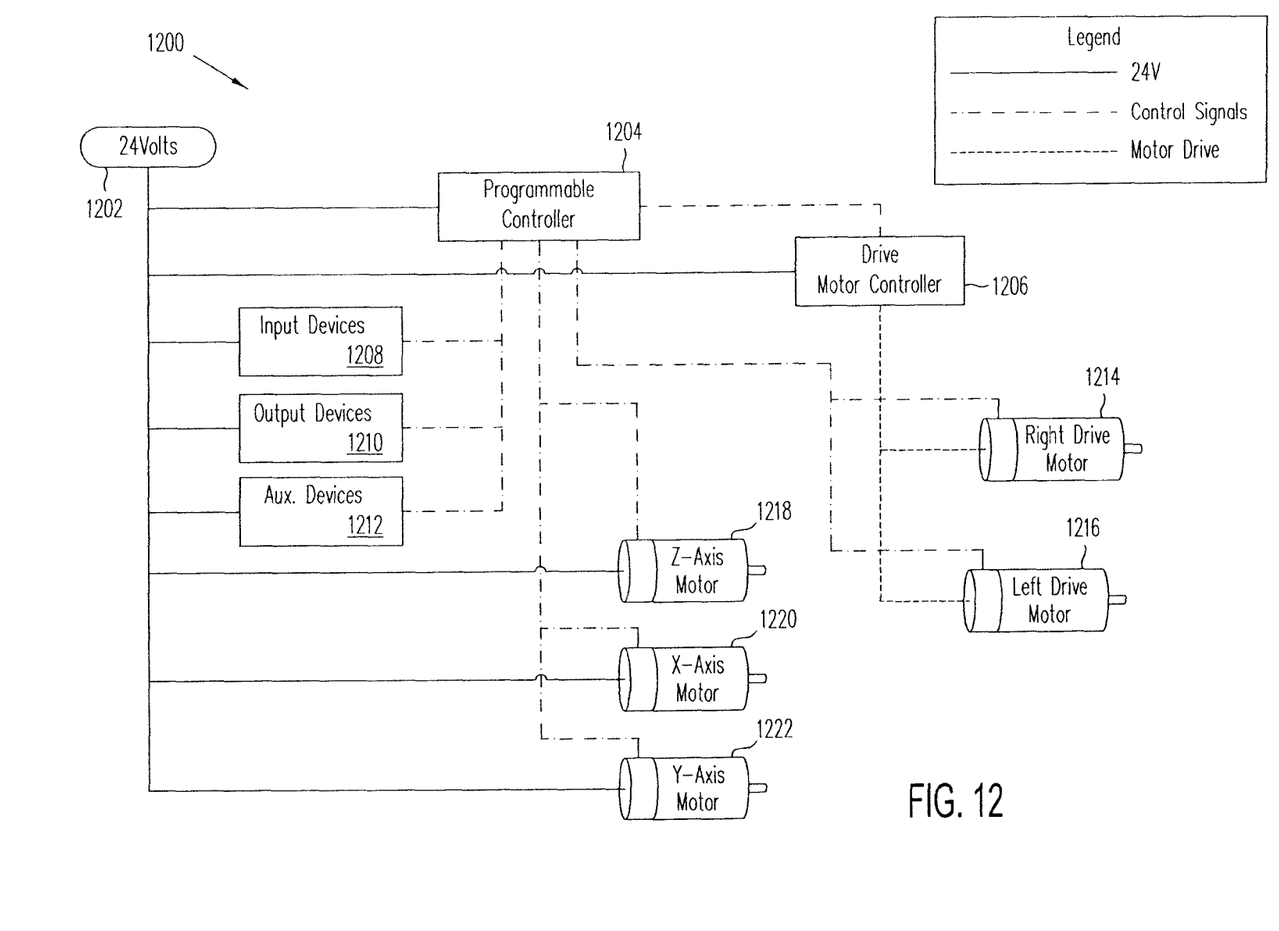
FIG. 12 is an electronics block diagram used by the MTV according to the present invention.

A block diagram 1200 of the MTV's onboard electronics is shown in FIG. 12. A common power bus 1202 of 24V is shown supplying power to all the onboard components; however, a variety of devices requiring different DC voltages are possible using DC to DC converters. The control signals represent different types of signals depending on the device it supports. The input 1208, output 1210, and auxiliary devices 1212 include discrete digital, analog, or protocols like RS232 or USB, for example. The drive motor controller 1206 provides the specific power signals to drive the motors 1214 and 1216. These drive motors 1214 and 1216 may have specific requirements and could be part of a matching set. The control signals on the drive motors 1214 and 1216 comprise positioning information from encoders or Hall Effect feedback and a motor brake on/off. X, Y, and Z axis motors 1220, 1222, and 1218 are also coupled to bus 1202.

Battery monitoring for the MTV is described in detail below.

Battery temperature monitoring is used to prevent battery thermal run-a-way conditions during charging. Most battery chargers have built-in voltage and current monitoring and are self-regulating. These self-regulating charging circuits start with a full current quick charge and limit the current to low current trickle charge near the end of the charging cycle. These charging circuits, when working correctly, do not overcharge the battery; however, they can produce catastrophic battery damage when they fail. When these self-adjusting charging circuits or batteries fail, the sealed lead-acid batteries can go into a thermal run-a-way condition causing the batteries to become extremely hot, swell, and leak acid if the outer battery case is compromised. The programmable controller monitors the normal operating temperature using a thermocouple or other type of temperature sensing device. If the batteries exceed the normal operating temperature, the MTV is placed into an emergency off state and the charging voltage is removed.

PARTS LIST 1 wireless network
2 docking camera
3 cassette camera
4 pneumatic mounts
5 vertical lift
6 laser scanner
7 secondary coil
8 standard caster
9 drive wheels
10 spring loaded caster
11 battery unit
12 drive motor controller
13 electronics panels
14 joystick
15 cassette transfer arm
16 track sensor
18 fan filter unit
20 cassette
22 X-axis motor
24 Z-axis motor
26 Y-axis motor
100 MTV side view
200 MTV front view
300 MTV cassette transfer view
400 collision avoidance block diagram
402 joystick
404 A/D converter
406 programmable controller
408 digital I/O
410 safety laser scanner
412 track sensor
414 audible signal
416 visual signal
418 motor controller
420 right motor
422 left motor
500 safety zones
502 MTV
504 zone 0
506 zone 1
508 zone 2
510 zone 3
600 safety zone flow chart
602 start
604 joystick forward motion
606-614 object in zone 3
616-624 object in zone 2
626-634 object in zone 1
636-644 no object detected
700 wireless communications
702 wireless access point
704 factory host server
706 network switch
708 wireless network client
710 cassette ID barcode camera
712 docking station ID barcode camera
800 spring loaded casters diagram
802 lower frame
804 spring loaded caster
806 caster wheel
808 cantilever arms
810 caster leg
812 horn base
814 mounting base
816 spring retainer
818 spring holder
820 spring
822 spring pin
900 pneumatic mounts diagram
902 cassette supports
904 top mount
906 pneumatic mounts
908 MTV plateform
1000 magnetic vibration control mount diagram
1002 top opposing magnet
1004 bottom opposing magnet
1006 base
1008 alignment shaft
1100 power source diagram
1102 AC power outlet
1104 primary coil
1106 secondary coil
1108 24 volt charger
1110 12 volt battery
1112 12 volt battery
1114 24 Volt supply
1200 electronics block diagram
1202 24 Volt supply
1204 programmable controller
1206 drive motor controller
1208 input devices
1210 output devices
1212 auxiliary devices
1214 right drive motor
1216 left drive motor
1218 z-axis motor
1220 x-axis motor
1222 y-axis motor Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of operating a material transport vehicle ("MTV"), the method comprising:
configuring a collision avoidance system resident on the MTV for:
accepting an input from a human operator proximate to the MTV for initiating forward motion of the MTV;
thereafter driving the MTV, by the human operator, through a clean room facility;
configuring a plurality of safety zones proximate to the MTV;
detecting an intrusion of an obstacle in the clean room facility into one of the plurality of safety zones;
limiting a maximum allowable forward motion of the MTV by an amount determined by the safety zone associated with the detected intrusion, wherein a maximum limitation of the allowable forward motion corresponds to an intrusion into a safety zone closest to the MTV and a minimum limitation of the allowable forward motion corresponds to an intrusion into a safety zone farthest from the MTV; and
limiting a maximum allowable turning motion of the MTV by an amount determined by the proximity of the safety zone to the MTV, wherein a maximum limitation of the allowable turning motion of the MTV corresponds to an intrusion into the safety zone farthest from the MTV and a minimum limitation of the allowable turning motion of the MTV corresponds to an intrusion into the safety zone closest to the MTV.

2. The method of claim 1 further comprising varying an audio output of the MTV by an amount determined by the proximity of the safety zone to the MTV.

3. The method of claim 2, wherein varying the audio output comprises varying the frequency of a pulsed audio tone.

4. The method of claim 1 further comprising varying a visual output of the MTV by an amount determined by the proximity of the safety zone to the MTV.

5. The method of claim 4, wherein varying the visual output comprising varying the frequency of a strobed visual output.

6. The method of claim 1 wherein the plurality of safety zones comprises four contiguous safety zones.

7. The method of claim 1 wherein the plurality of safety zones are configured using a laser scanner associated with the MTV.

8. The method of claim 1 wherein the MTV transports cassettes containing glass substrates for amorphous silicon imaging arrays or flat panel displays.

9. The method of claim 8 further comprising providing a wireless material tracking system for providing identification of cassettes within the MTV and the location of the MTV while it is docked.

10. The method of claim 8 further comprising providing a cassette vibration control mechanism.

11. The method of claim 10 wherein the cassette vibration control mechanism comprises pneumatic spring mounts at a cassette support interface.

12. The method of claim 1 further comprising providing a lower frame of the MTV with enhanced vibration control.

13. The method of claim 12 wherein the enhanced vibration control comprises shock absorbing spring loaded caster wheels.

14. The method of claim 1 further comprising providing a particle reduction mechanism for the MTV including at least setting the hardness of the MTV caster wheels to about a 95 durometer hardness value.

15. The method of claim 1 further comprising providing the MTV with a non-contact inductive charging system.

16. The method of claim 1 further comprising providing the MTV with an automated docking mechanism to maneuver the MTV into a material transfer point or charging docking station.

17. The method of claim 1 further comprising providing the MTV with battery temperature, current, and voltage monitoring to prevent hazardous thermal run-a-way conditions.

* * * * *